(12) United States Patent
Lardelli et al.

(10) Patent No.: US 9,198,536 B2
(45) Date of Patent: Dec. 1, 2015

(54) DRIP TRAY FOR BEVERAGES DISPENSER

(71) Applicant: NESTEC S.A., Vevey (CH)

(72) Inventors: Silvio Lardelli, St Gallen (CH); Michel Hess, Winterthur (CH); Cedric Rey, La Sarraz (CH); Roberto Angelo Calderone, Orbe (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/361,492

(22) PCT Filed: Dec. 11, 2012

(86) PCT No.: PCT/EP2012/075046
§ 371 (c)(1),
(2) Date: May 29, 2014

(87) PCT Pub. No.: WO2013/087607
PCT Pub. Date: Jun. 20, 2013

(65) Prior Publication Data
US 2014/0352802 A1    Dec. 4, 2014

(30) Foreign Application Priority Data

Dec. 12, 2011  (EP) .................................. 11193005

(51) Int. Cl.
*B67D 1/16* (2006.01)
*A47J 31/44* (2006.01)

(52) U.S. Cl.
CPC .............. *A47J 31/44* (2013.01); *A47J 31/4428* (2013.01); *Y10T 137/5762* (2015.04)

(58) Field of Classification Search
CPC ........ B67D 1/16; A47J 31/4428; A47J 31/44; Y10T 137/5762
USPC .......................... 222/108–111, 129.1–129.4, 222/146.1–146.6; 137/312–314; 99/279–323
See application file for complete search history.

(56) References Cited

U.S. PATENT DOCUMENTS

| 237,404 | A | * | 2/1881 | McKeever | 222/108 |
| 8,091,469 | B2 | * | 1/2012 | Cahen et al. | 99/279 |
| 2007/0266861 | A1 | * | 11/2007 | Hart | 99/279 |
| 2011/0070348 | A1 | * | 3/2011 | Burton-Wilcock et al. | 426/431 |

FOREIGN PATENT DOCUMENTS

EP    0153549    9/1985

OTHER PUBLICATIONS

International Search Report corresponding to related International Patent Application No. PCT/EP2012/075046 mailed Aug. 6, 2013.
International Written Opinion corresponding to related International Patent Application No. PCT/EP2012/075046 mailed Aug. 6, 2013.

* cited by examiner

*Primary Examiner* — Lien Ngo
(74) *Attorney, Agent, or Firm* — K&L Gates LLP

(57) ABSTRACT

The invention concerns a beverage dispenser (2) comprising :—a beverage module having at least one beverage outlet (21),—a drip tray (1), said drip tray comprising: a collecting tray (11), and a filtering member (12) positioned above at least the front part (111) of the tray, wherein the drip tray comprises a lid (13) for covering the back part (112) of the tray.

7 Claims, 2 Drawing Sheets

DRIP TRAY FOR BEVERAGES DISPENSER

CROSS REFERENCE TO RELATED APPLICATIONS

The present application is a National Stage of International Application No. PCT/EP2012/075046, filed on Dec. 11, 2012, which claims priority to European Patent Application No. 11193005.3, filed Dec. 12, 2011, the entire contents of which are being incorporated herein by reference.

FIELD OF THE INVENTION

The present invention relates to a drip tray for machine producing beverages.

BACKGROUND OF THE INVENTION

Beverage production machines usually implement a drip tray adapted to collect the dripping liquid and waste liquid (water or beverage) that does not readily fall into the recipient in which the beverage is served. The drip tray is usually composed of a tray and of a grid laying on the upper part of the tray. The grid aims at supporting the recipient in which the beverage is served and avoiding that the bottom of this recipient lays in the dripping or waste liquid. The grid generally simply lays on the upper part of the tray without fixing means or with partial fixing means so that it can be easily removed from the tray, the tray can be emptied and the tray and the grid can be fully cleaned.

When the drip tray is removed from the machine, the operator must be careful to not lean it too much otherwise the waste liquid may overflow the edges of the drip tray and may fall and dirty the machine or parts around the machine.

The aim of the present invention is to provide a solution to the above problem and to propose a drip tray for a beverage production machine which enables the operator to remove it in an easy and convenient way that limits the risk of dirtiness around the machine and that makes the transportation of the drip tray full of liquid from the machine to the sink much more convenient.

SUMMARY OF THE INVENTION

According to a first aspect, the invention concerns a beverage dispenser comprising :
  a beverage module having a beverage outlet,
  a drip tray, said drip tray comprising :
    a collecting tray, and
    a filtering member positioned above at least the front part of the tray,
wherein the drip tray comprises a lid for totally covering the back part of the tray.

The present invention can relate to any kind of dispenser that delivers a beverage. The dispenser can either produce or simply dispense the beverage. In that latter case the beverage is only stored in the dispenser or near the dispenser (like water or ready-to-drink beverage). When the dispenser produces the beverage, said beverage can be produced by interaction between a food ingredient and a diluent. The food ingredient can be a soluble food ingredient concentrate like a soluble powder or a liquid concentrate or it can be an infusable food ingredient like a roast and ground coffee powder or tea leaves. The diluent can either dissolve the soluble food ingredient concentrate or extract the infusable food ingredient. It is usually water.

Consequently the beverage module of the dispenser comprises at least a beverage outlet. But it can also comprise devices for preparing or storing the beverage like : food ingredient or beverage storing container(s), diluent supply means, dosing device(s), device for processing the food ingredients, command input devices, output devices like a screen.

According to the invention, the beverage dispenser comprises a drip tray configured for supporting a container, in which the beverage is dispensed from the outlet, and for collecting liquid like drips and spills. The drip tray comprises a collecting tray and a filtering member that is positioned on the top of the collecting tray. When the drip tray is in the dispenser the filtering member is positioned at least under the beverage outlet so that liquid dripping from the beverage outlet can be received in the collecting tray. Usually the filtering member is above at least the front part of the tray. The filtering member is usually a grid or plate having at least one drain-hole or perforation for evacuating liquid to the tray. Besides, according to the invention, the drip tray comprises a lid for totally covering the back part of the tray. By totally covering the back part of the tray, it is meant that the lid closes the whole upper surface of back part of the tray from the back to the front and from the right side to the left side of the back part. In particular the lid does not present any opening. Most preferably said lid cooperates with the back part of the tray in a liquid tightness manner, that is to say that a liquid present in the back part of the tray cannot leak through the joined parts of the lid and the tray, in particular when the drip tray is removed from the dispenser.

Preferably the drip tray comprises a joint for maintaining liquid tightness between the tray and the lid. According to a preferred embodiment the joint is made of a soft plastic material. Preferably this soft material is a silicone polymer or a thermoplastic elastomer (TPE). Preferably the other parts of the drip tray, in particular the collecting tray and the lid are made of a hard plastic material. According to a preferred embodiment the collecting tray and the lid can be made of polypropylene plastic (PP), polyamide plastic (PA), acrylonitrile butadiene styrene plastic (ABS). In the present text, by soft it should be understood that the material is resiliently deformable when a pressure is applied on it. By hard material it should be understood that the material is rigid and non deformable.

According to the preferred embodiment the lid is removable. Consequently the operator can remove the drip tray from the dispenser and remove the lid to empty the spilled liquid from the tray and for washing the tray and the lid.

According to an embodiment the collecting tray can comprise a partition wall positioned under the front extremity of the lid and said partition wall comprises at least one slit. This partition wall divides the internal volume of the tray in a back side volume covered by the lid and a front side volume covered by the filtering member. The slit is configured for letting liquid flows from the front side volume to the back side volume. Preferably the lid abuts on the top of the partition wall.

According to an embodiment the drip tray can be positioned in the beverage dispenser as a drawer. The beverage dispenser can comprise a receiving area in which the drip tray can be placed and easily slide in and out of.

According to the preferred embodiment, the drip tray is configured so that when it is positioned in the dispenser its bottom wall is inclined relative to the horizontal and so that the liquid it holds is directed to its back wall. The inclination can be due to the inclination of the drip tray bottom wall or to the inclination of the drip tray in the dispenser receiving area.

According to an embodiment the beverage dispenser comprises a sensor to detect the level of liquid in the drip tray. The sensor is preferably an electrical or electrical capacitive sensor. In such a capacitive sensor two electrodes are arranged within the collecting tray at a distance from the bottom of the collecting tray. The liquid within the drip tray acts as a dielectric such that the capacity of the capacitive sensor changes along when a liquid level is reached within the drip tray. The electrodes are controlled by the control unit of the dispenser. Consequently an alert can be created when the drip tray must be emptied.

According to a particular embodiment the drip tray can comprise a valve in its back part. The valve is preferably configured for being connected to a drain port in order to evacuate liquid from the drip tray. The connection between the valve and the drain port is preferably automatically made when the drip tray is positioned in the dispenser.

In the present application, the terms "front", "back", "right", "left", "top" and "bottom" are used to describe the relational positioning of features of the invention. These terms should be understood to refer to the drip tray in its normal orientation when inserted in the beverage dispenser as shown for example in FIG. 3A.

BRIEF DESCRIPTION OF THE DRAWINGS

The characteristics and advantages of the invention will be better understood in relation to the following figures where.

DETAILED DESCRIPTION OF THE DRAWINGS

Figure 1:
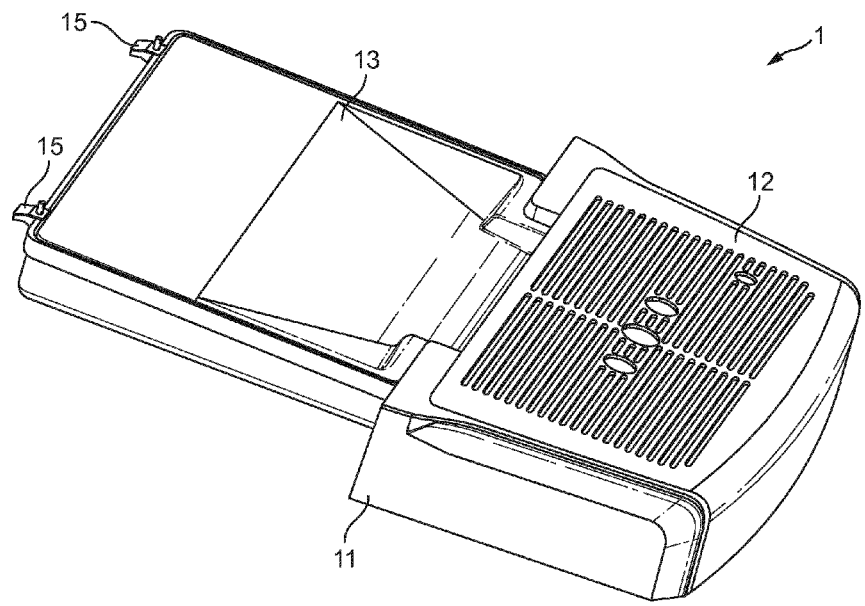
FIGS. 1 and 2 are perspective views of a drip tray according to the present invention.
Figure 2:
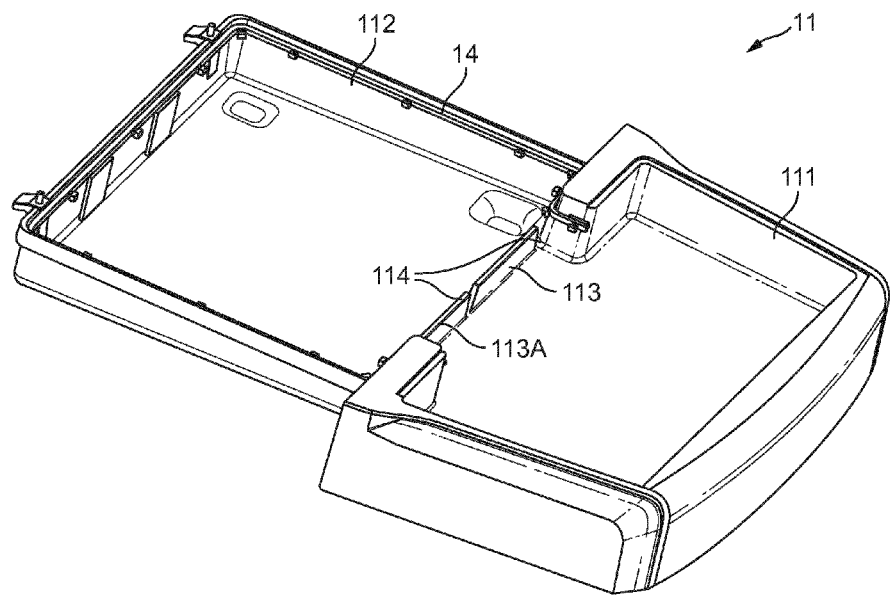

FIG. 1 illustrates a drip tray 1 according to the present invention comprising a collecting tray 11, a filtering member 12 and a lid 13. FIG. 2 illustrates the same drip tray in which the filtering member 12 and the lid 13 have been removed for a better understanding. The collecting tray 11 is a plate with low edges on its sides. In use it is covered on its front part 111 by the filtering member 12 which is a grid on which a container can be placed for receiving a beverage and through which a liquid can flow if no container is present. In use the collecting tray is covered on its back part 112 by the lid 13. The lid 13 fully covers the surface of the back part 112 of the collecting tray said surface extending from the right side to the left side of the collecting tray back part and from the back side of the collecting tray back part up to its limit with the front part 111 of the collecting tray. The lid 13 does not comprise any opening. As illustrated in FIG. 2, the collecting tray 11 comprises a partition wall 113 that divides the internal volume of the collecting tray in a front internal volume and a back internal volume. The partition wall 113 is positioned so that when the lid 13 covers the collecting tray then the partition wall is under the front extremity of the lid. The partition wall 114 comprises at least one slit 113 enabling the liquid flow communication between the two internal volumes of the collecting tray.

The drip tray comprises a joint 14 on the upper periphery of its back part so that when the lid 13 covers the collecting tray a liquid tightness connection is established between the both. It is meant that even if during transportation to the sink the drip tray is not exactly hold in a horizontal position, then no liquid can flow through the joint during the transportation to the sink or though any opening in the lid.

Figure 3:
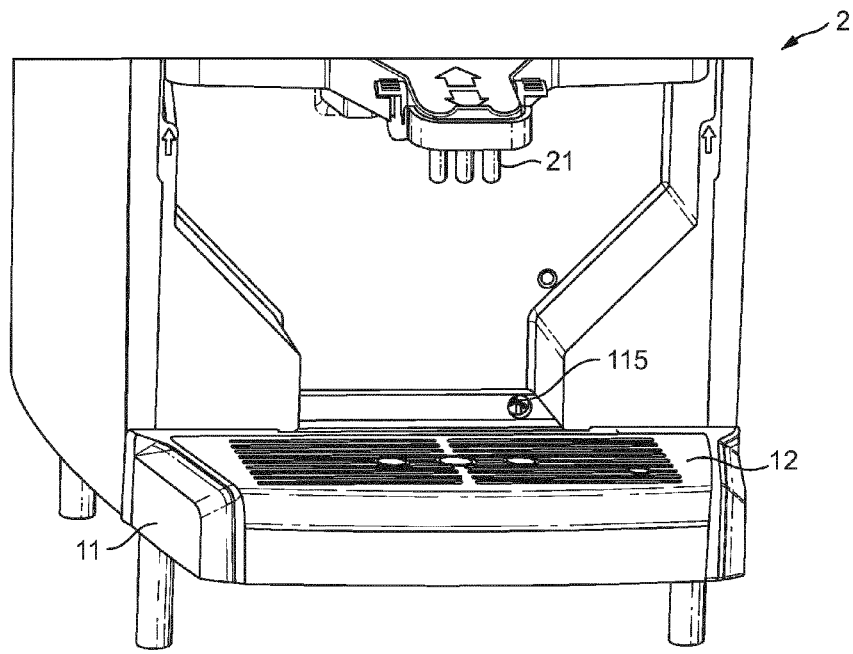
FIGS. 3 and 4 are perspective views of the dispensing area of a beverage dispenser configured for receiving the drip tray of FIG. 1 where respectively the drip tray is present and the drip tray has been removed.
Figure 4:
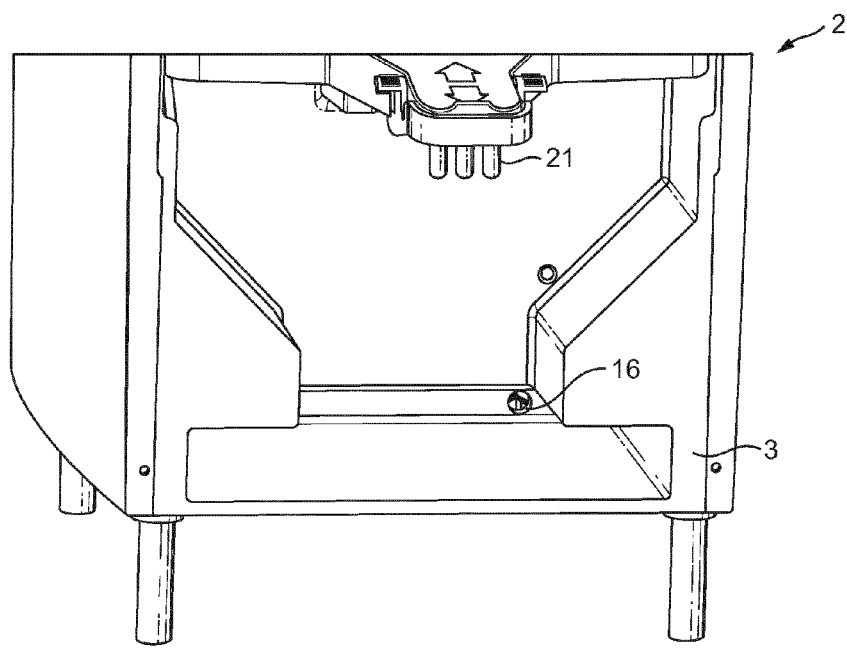

FIG. 3 illustrates a beverage dispenser 2 comprising several beverage outlets 21 and a drip tray 11, 12 according to FIGS. 1, 2 : the lid 13 has been removed from the drip tray for illustration of its back part. In its back wall the drip tray comprises an outlet 115. FIG. 4 illustrates the same beverage dispenser 2 from which the drip dray has been removed. It presents a receiving area 3 for positioning the drip tray. The drip tray can be introduced in the receiving area 3 like a drawer. According to a particular mode the height of the receiving area 3 can be determined so that when the drawer is positioned inside the receiving area 3 a pressure is exercised on the lid 13 and in consequence the lid is pressed against the soft joint 14.

According to a particular embodiment illustrated in FIGS. 3 and 4 the drip tray of the dispenser can be plugged to a drain. Therefore the collecting tray 11 can comprise a valve 115 that cooperates with a drain port 16 in the dispenser when the drip tray is positioned in the dispenser. The valve can be a simple valve of which seat is loaded by a spring. The fact of positioning the drip tray in the receiving area of the dispenser makes the spring compress and the valve open and vice versa.

Due to the configuration of the drawer with the lid 13 covering the back part 112 of the collecting tray 11, the operator can remove the drip tray 1 that contains liquid from the dispenser without spilling liquid out of the tray. He can simply pull the drip tray out of the dispenser receiving area 3 and slightly incline it vertically so that the back part is placed downwards. By this movement all the liquid in the collecting dray is collected in the back part covered by the lid in a tightness manner. The lid is configured so as to create a tightness volume in the back part of the drip tray. The partition wall helps in maintaining liquid in the back part of the collecting tray. The operator can move the drip tray and can slightly lean it—e.g. while walking—without fearing to drop liquid out of it. In particular, when the operator removes the drip tray from the dispenser, a wave of liquid is usually created from the back of the drip tray to the front: in the prior art this wave could reach the front of the drip tray and overflow on the operator. The partition wall avoids this liquid overflow.

Once the operator is near the sink he just has to remove the filtering member 12—which usually simply rests on the collecting tray—and to slide his fingers under the lid 13 to make it detach from the collecting tray 11 and to empty said collecting tray.

The drip tray of the present invention presents the advantage of enabling a proper manipulation.

The invention claimed is:
1. A beverage dispenser comprising:
   a beverage module having at least one beverage outlet; and
   a drip tray positioned in the beverage dispenser as a drawer, the drip tray comprising:
      a collecting tray, and
      a filtering member positioned above at least a front part of the tray,
   the drip tray comprising a lid for totally covering a back part of the tray, the lid being removable and presenting no opening, and
   the collecting tray comprising a partition wall, the partition wall being positioned under a front extremity of the lid and comprising at least one slit.
2. The beverage dispenser of claim 1, wherein the drip tray comprises a joint between the collecting tray and the lid.
3. The beverage dispenser of claim 2, wherein the joint is made of a soft plastic material.

4. The beverage dispenser of claim 1, wherein the lid abuts on a top of the partition wall.

5. The beverage dispenser of claim 1, wherein the drip tray comprises a sensor to detect a level of liquid in the drip tray.

6. The beverage dispenser of claim 1, wherein the drip tray is configured so that when it is positioned in the beverage dispenser, a bottom wall of the drip tray is inclined relative to the horizontal and so that a liquid it holds is directed to a back wall of the drip tray.

7. The beverage dispenser of claim 1, the drip tray further comprising a valve in a back wall of the back part of the tray, the valve being so constructed and arranged to align with a drain port in the beverage dispenser.

\* \* \* \* \*